(12) United States Patent
Romanov et al.

(10) Patent No.: US 10,920,601 B2
(45) Date of Patent: Feb. 16, 2021

(54) BLADE OUTER AIR SEAL FIN COOLING ASSEMBLY AND METHOD

(71) Applicant: United Technologies Corporation, Farmington, CT (US)

(72) Inventors: Dmitriy A. Romanov, Wells, ME (US); Jose R. Paulino, Saco, ME (US); Ken F. Blaney, Middleton, NH (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 25 days.

(21) Appl. No.: 16/520,874

(22) Filed: Jul. 24, 2019

(65) Prior Publication Data
US 2020/0102848 A1 Apr. 2, 2020

Related U.S. Application Data

(63) Continuation of application No. 15/118,521, filed as application No. PCT/US2015/015540 on Feb. 12, 2015, now Pat. No. 10,443,425.

(60) Provisional application No. 61/939,841, filed on Feb. 14, 2014.

(51) Int. Cl.
*F01D 11/08* (2006.01)
*B22C 9/10* (2006.01)
(Continued)

(52) U.S. Cl.
CPC ............... *F01D 11/08* (2013.01); *B22C 9/10* (2013.01); *B22C 9/24* (2013.01); *F01D 11/24* (2013.01);
(Continued)

(58) Field of Classification Search
CPC . F01D 11/08; F01D 11/24; B22C 9/10; B22C 9/24; F05D 2230/211;
(Continued)

(56) References Cited

U.S. PATENT DOCUMENTS 4,466,772 A 8/1984 Okapuu
6,913,064 B2 7/2005 Beals et al.
(Continued)

OTHER PUBLICATIONS

International Search Report and Written Opinion for International Application No. PCT/US2015/015540 dated Nov. 24, 2015.
(Continued)

*Primary Examiner* — J. Todd Newton
*Assistant Examiner* — Sabbir Hasan
(74) *Attorney, Agent, or Firm* — Carlson, Gaskey & Olds, P.C.

(57) ABSTRACT

A blade outer air seal according to an exemplary aspect of the present disclosure includes, among other things, a body to be distributed circumferentially about a blade array. The body has a plurality of grooves, which can, for example, improve the aerodynamic efficiency of a turbine. A fin is between a first groove and a second groove of the plurality of grooves. The fin extends radially from the body and terminates at a radially inner fin face that provides one or more cooling outlets. A sacrificial structure for forming internal cooling passages within a blade outer air seal and a method of cooling an interface between a blade outer air seal and a rotating blade array is also disclosed.

20 Claims, 3 Drawing Sheets

(51) Int. Cl.
  *F01D 11/24* (2006.01)
  *B22C 9/24* (2006.01)
(52) U.S. Cl.
  CPC .... *F05D 2230/211* (2013.01); *F05D 2240/11* (2013.01); *F05D 2260/204* (2013.01); *F05D 2260/22141* (2013.01); *F05D 2300/13* (2013.01); *Y02T 50/60* (2013.01)
(58) Field of Classification Search
  CPC ........... F05D 2240/11; F05D 2260/204; F05D 2260/22141; F05D 2300/13; Y02T 50/60
  See application file for complete search history.

(56) References Cited

U.S. PATENT DOCUMENTS

| | | | |
|---|---|---|---|
| 7,137,776 | B2 | 11/2006 | Draper et al. |
| 7,650,926 | B2* | 1/2010 | Tholen ............... F01D 9/04 164/516 |
| 7,665,962 | B1 | 2/2010 | Liang |
| 7,686,065 | B2 | 3/2010 | Luczak |
| 7,942,188 | B2 | 5/2011 | Skelley, Jr. et al. |
| 8,475,122 | B1* | 7/2013 | Liang ............... F01D 11/10 415/173.1 |
| 2009/0087306 | A1 | 4/2009 | Tholen et al. |
| 2011/0044803 | A1 | 2/2011 | Di Paola et al. |
| 2013/0081775 | A1 | 4/2013 | Bullied et al. |
| 2013/0170963 | A1 | 7/2013 | Mironets et al. |
| 2013/0340966 | A1 | 12/2013 | Tholen et al. |

OTHER PUBLICATIONS

Supplementary European Search Report for European Application No. 15792044.8 completed Jan. 12, 2017.

International Preliminary Report on Patentability for International Application No. PCT/US2015/015540 dated Aug. 25, 2016.

\* cited by examiner

BLADE OUTER AIR SEAL FIN COOLING ASSEMBLY AND METHOD

CROSS-REFERENCE TO RELATED APPLICATIONS

This application is a continuation of U.S. patent application Ser. No. 15/118,521 filed Aug. 12, 2016, which is a National Application of International Application No. PCT/US2015/015540 filed Feb. 12, 2015, which claims priority to U.S. Provisional Application No. 61/939,841 filed Feb. 14, 2014.

STATEMENT REGARDING FEDERALLY SPONSORED RESEARCH OR DEVELOPMENT

This invention was made with government support under U.S. Government contract No. FA8650-09-D-2923-0021, awarded by the United States Air Force. The Government has certain rights in this invention.

BACKGROUND

This disclosure relates generally to a blade outer air seal and, more particularly, to a cooled, grooved blade outer air seal.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

The compressor and turbine sections of a gas turbine engine include alternating rows of rotating blades and stationary vanes. The turbine blades rotate and extract energy from the hot combustion gases that are communicated through the gas turbine engine. The turbine vanes prepare the airflow for the next set of blades. The vanes extend from platforms that may be contoured to manipulate flow.

An outer casing of an engine static structure may include one or more blade outer air seals (BOAS) that provide an outer radial flow path boundary for the hot combustion gases. The BOAS are arranged circumferentially adjacent to each other and meet at mate faces. The tips of rotating blades seal against radially inner faces of the BOAS. Complex BOAS geometries have been developed to enhance sealing interfaces between the BOAS and the blade tips. Cooling these complex geometries is often difficult.

SUMMARY

A blade outer air seal according to an exemplary aspect of the present disclosure includes, among other things, a body to be distributed circumferentially about a blade array. The body has a plurality of grooves, which can, for example, improve the aerodynamic efficiency of a turbine. A fin is between a first groove and a second groove of the plurality of grooves. The fin extends radially from the body and terminates at a radially inner fin face that provides one or more cooling outlets.

In another example of the foregoing blade outer air seal, an axial width of the first groove is about the same as an axial width of the second groove.

In another example of any of the foregoing blade outer air seals, an axial width of the fin is about the same as both the axial width of the first groove and the axial width of the second groove.

In another example of any of the foregoing blade outer air seals, an axial width of the fin is from 0.5 to 3.0 percent of an axial width of the body.

In another example of any of the foregoing blade outer air seals, an axial width of the fin is less than 1 millimeter.

In another example of any of the foregoing blade outer air seals, the fin provides internal cooling passages extending from a cooling cavity, through the fin, to at least one of the cooling outlets.

In another example of any of the foregoing blade outer air seals, the internal cooling passages comprise a first radially extending portion from the cooling cavity, a second radially extending portion from the cooling outlet, and a circumferentially extending portion connecting the first and second radially extending portions.

In another example of any of the foregoing blade outer air seals, the fin is one of a plurality of fins extending radially from the body.

In another example of any of the foregoing blade outer air seals, the fin is one of from five to twenty-five fins separate and distinct from each other.

In another example of any of the foregoing blade outer air seals, the radially inner fin face is configured to interface directly with the blade array.

A sacrificial structure for forming internal cooling passages within a blade outer air seal according to an exemplary aspect of the present disclosure includes, among other things, a refractory metal core to form an internal cooling passage within a fin of a blade outer air seal.

In another example of the foregoing sacrificial structure, the refractory metal core extends to a radially inner core face to align with a radially inner fin face of the fin.

In another example of any of the foregoing sacrificial structures, the refractory metal core includes a first radially extending portion, a second radially extending portion, and a circumferentially extending portion connecting the first and second radially extending portions.

In another example of any of the foregoing sacrificial structures, an axial width of the fin is from 0.5 to 3.0 percent of an axial width of the body.

In another example of any of the foregoing sacrificial structures, the fin is positioned axially between a first circumferentially extending groove and a second circumferentially extending groove in a body of a blade outer air seal.

A method of cooling an interface between a blade outer air seal and a rotating blade array according to an exemplary aspect of the present disclosure includes, among other things, communicating a flow of fluid through a cooling passage within a fin of a blade outer air seal to an interface between the blade outer air seal and a rotating blade array.

In another example of the foregoing method, the method includes communicating the fluid through the cooling passage to a cooling outlet at a radially inner fin face of the fin.

In another example of any of the foregoing methods, the method includes communicating the flow through the cooling passage in a radial direction, then a circumferential direction, and then a radial direction to the cooling outlet.

In another example of any of the foregoing methods, the fin is positioned between circumferentially extending grooves in a body of the blade outer air seal.

DETAILED DESCRIPTION

Figure 1:
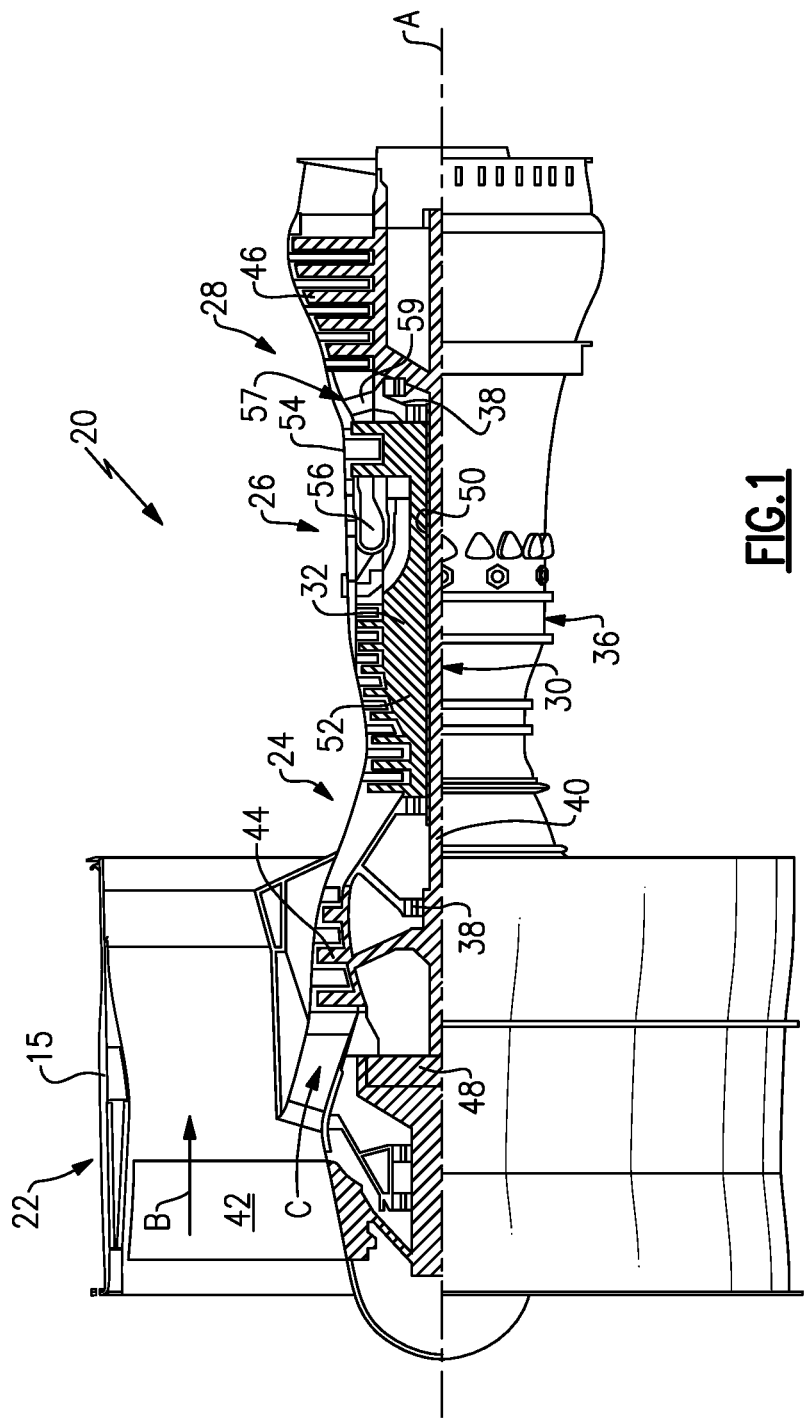
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
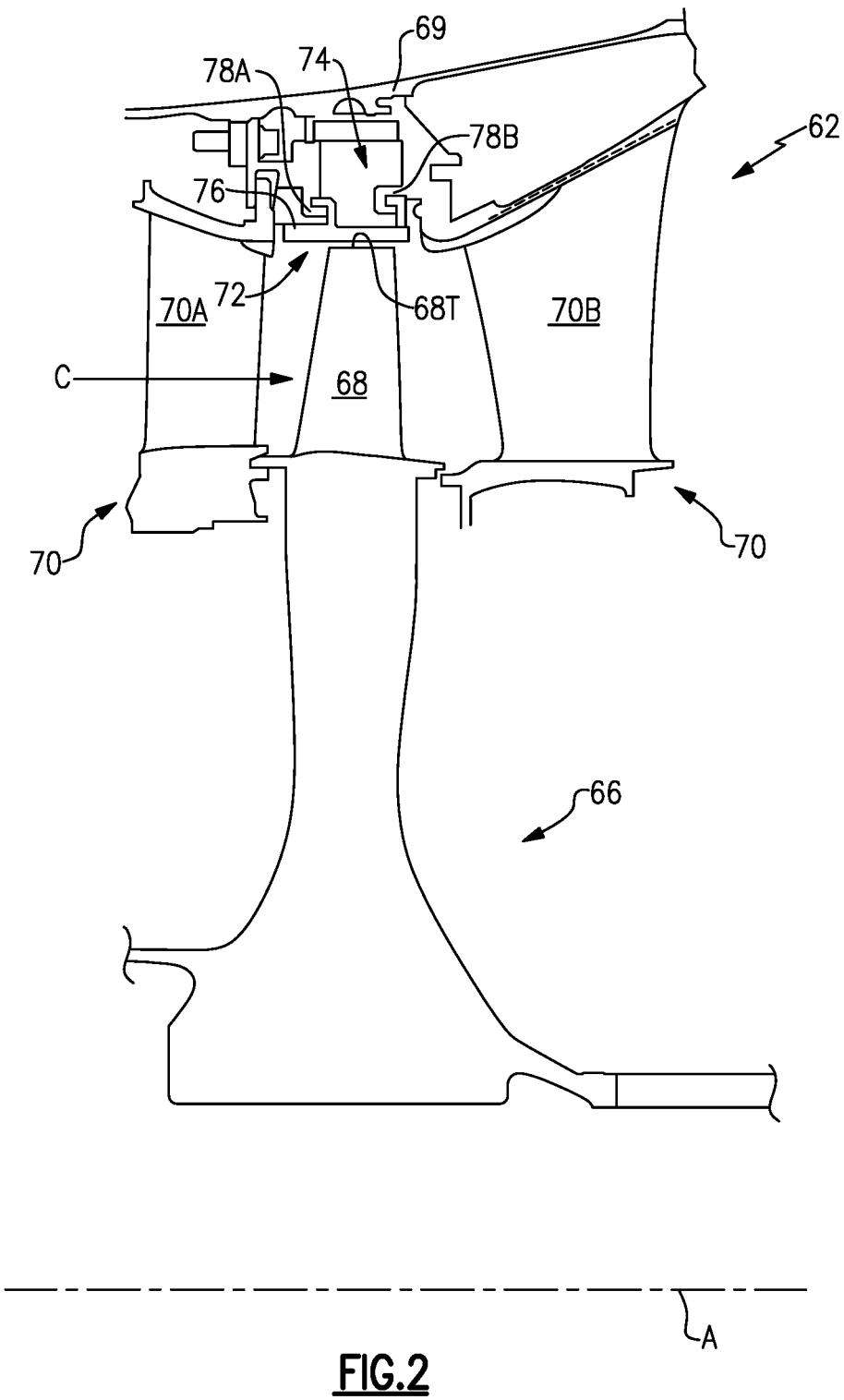
FIG. 2 illustrates a cross-section of a portion of a gas turbine engine.

FIG. 2 illustrates a portion 62 of a gas turbine engine, such as the gas turbine engine 20 of FIG. 1. In this exemplary embodiment, the portion 62 represents the high pressure turbine 54. However, it should be understood that other portions of the gas turbine engine 20 could benefit from the teachings of this disclosure, including but not limited to, the compressor section 24 and the low pressure turbine 46.

In this exemplary embodiment, a rotor disk 66 (only one shown, although multiple disks could be axially disposed within the portion 62) is mounted to the outer shaft 50 and rotates as a unit with respect to the engine static structure 36. The portion 62 includes alternating rows of rotating blades 68 (mounted to the rotor disk 66) and vanes 70A and 70B of vane assemblies 70 that are also supported within an outer casing 69 of the engine static structure 36. The blades 68 are circumferentially distributed in an array about the rotor disk 66.

Each blade 68 of the rotor disk 66 includes a blade tip 68T that is positioned at a radially outermost portion of the blades 68. The blade tips 68T extend toward a blade outer air seal (BOAS) assembly 72. The BOAS assembly 72 may find beneficial use in many industries including aerospace, industrial, electricity generation, naval propulsion, pumps for gas and oil transmission, aircraft propulsion, vehicle engines and stationery power plants.

The BOAS assembly 72 is disposed in an annulus radially between the outer casing 69 and the blade tip 68T. The BOAS assembly 72 generally includes a multitude of BOAS segments 76 (only one shown in FIG. 2). The BOAS segments 76 may form a full ring hoop assembly that encircles associated blades 68 of a stage of the portion 62.

A cavity 74 that extends axially between the forward flange 78A and the aft flange 78B and radially between the outer casing 69 and the BOAS segment 76. A secondary cooling airflow may be communicated into the cavity 74 to provide a dedicated source of cooling airflow for cooling the BOAS segments 76. The secondary cooling airflow can be sourced from the high pressure compressor 52 or any other upstream portion of the gas turbine engine 20.

Figure 5:
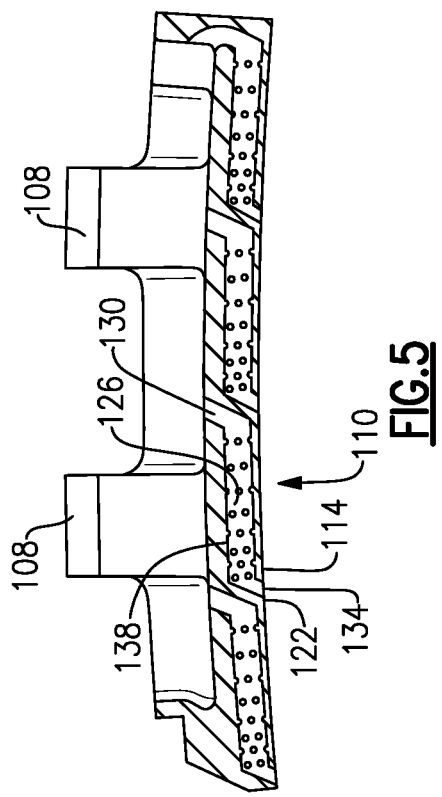
FIG. 5 shows a section view at line A-A in FIG. 4.
Figure 6:
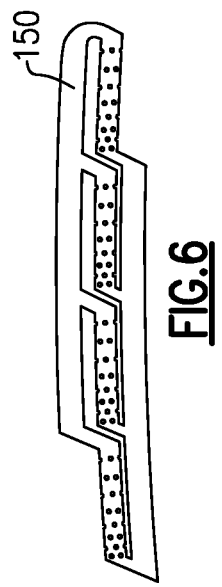
FIG. 6 shows a refractory metal core fin to provide a cooling passage in a fin of the BOAS of FIGS. 3-5.
Figure 7:
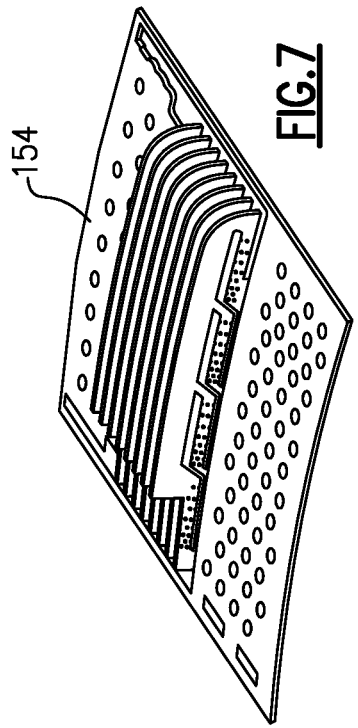
FIG. 7 shows a refractory metal structure to provide various passages in the BOAS of FIGS. 3-5.
Figure 3:
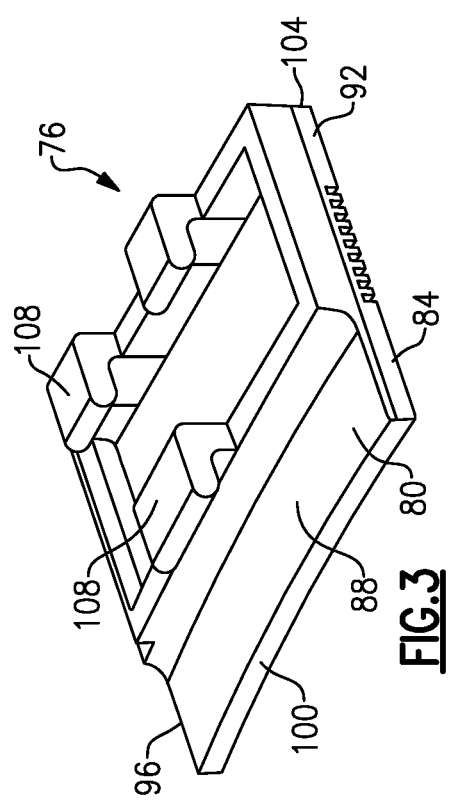
FIG. 3 illustrates a perspective view of a blade outer air seal (BOAS) segment.
Figure 4:
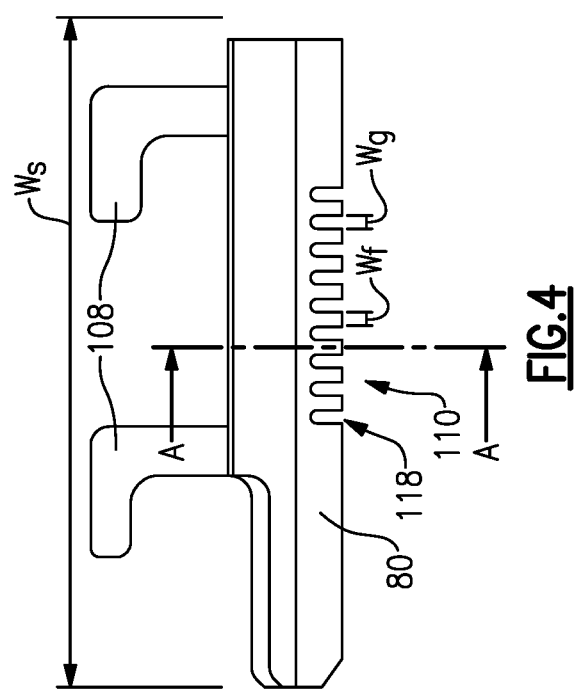
FIG. 4 shows a side view of the FIG. 3 BOAS segment.

FIGS. 3-5 illustrate one exemplary embodiment of a BOAS segment 76 that may be incorporated into a gas turbine engine, such as the gas turbine engine 20. The BOAS segment 76 includes a body 80 having a radially inner face 84 facing radially toward the blade tip 68T, and a radially outer face 88 that faces away from the blade tip 68T toward the cavity 74. (See FIG. 2.)

The radially inner face 84 and the radially outer face 88 extend circumferentially from a first mate face 92 to a second mate face 96, and extend axially from a leading edge face 100 to a trailing edge face 104. Support hooks 108 extend from the radially outer face 88. A plurality of fins 110 extend from the radially inner face 84 of the body 80. The fins 110 are considered thin ligaments in some examples.

The example embodiment includes eight fins 110. Other examples may include from four to eight fins separate and distinct from each other. Still other examples, such as BOAS segments used in industrial gas turbine engines, may include from forty to sixty fins.

The fins 110 each terminate radially at a radially inner fin face 114. Each of the fins 110 is positioned between grooves 118 extending circumferentially within the body 80. The example BOAS segment 76 includes nine grooves 118 and eight resultant fins 110.

One or more of the radially inner fin faces 114 provide at least one cooling outlet 122, which represents the end of a cooling passage 126 extending through the respective one of the fins 110. The cooling passage 126 extends from the cavity 74. The secondary cooling airflow within the cavity 74 flows through the cooling passage 126 during operation and is delivered through the cooling outlet 122 to the radially inner fin face 114, which interfaces with the tip 68T.

The example cooling passage 126 includes a first radially extending portion 130 from the cavity 74 and a second radially extending portion 134 ending at the cooling outlet 122. A circumferentially extending portion 138 connects the first radially extending portion 130 to the second radially extending portion 134.

Each of the example fins 110 includes four separate and distinct cooling passages 126 distributed circumferentially through the fin 110. In another example, each of the fins 110 includes from three to six separate and distinct cooling passages 126. Other quantities of cooling passages 126 are possible. Some of the fins 110 may include more cooling passages 126 than others of the passages 126. The cooling outlets 122 of the cooling passages 126 are distributed circumferentially across the radially inner fin face 114.

As can be appreciated, communicating cooling fluid through the cooling passages 126 to the radially inner fin faces 114 helps to cool the fins 110 and the surrounding interfaces during operation of the engine 20.

The example fins 110 each have an axial width $W_f$. The grooves 118 have an axial width $W_g$. The seal body 80 has an axial width $W_s$. The axial widths $W_f$ of the fins 110 are each about the same in this example. The axial widths $W_g$ of the grooves 118 are also about the same in this example. In other examples, the axial widths $W_f$ of the fins 110 varies and the axial widths $W_g$ of the grooves 118 varies.

In this example, the axial width $W_g$ of each of the grooves 118 is about the same as the axial width $W_f$ as each of the fins 110. An axial width $W_f$ of the fin and the axial width $W_g$ of the groove are each less than 1 millimeter in this example.

In other examples, the axial widths $W_g$ of one or more of the grooves 118 may vary from the axial widths $W_f$ of some of the fins 110.

The axial widths $W_f$ of the fins 110 is from 0.5 to 3.0 percent of the overall axial width $W_s$ of the seal body 80, which represents the distance from the leading edge face 100 to the trailing edge face 104. Lower percentages within the 0.5 to 3.0 range are associated with industrial gas turbines in some examples. The higher percentages within the 0.5 to 3.0 range can be associated with aircraft gas turbines.

Since the axial width $W_g$ is about the same as the axial width $W_f$, the axial width $W_g$ is also from 0.5 to 3.0 percent of the overall axial width $W_s$ of the seal body 80.

The example BOAS segment 76 is cast. As can be appreciated, establishing cooling passages 126 in the relatively small and detailed structures of the fins 110 and the grooves 118 can be difficult.

In this example, a fin refractory metal (RMC) core 150 is used during casting to provide each of the cooling passages 126 within one of the fins 110. The fin RMC 150 is one of several fin RMCs held within a mold when casting the BOAS segment 76. Each of the fins 110, in this example, is molded about a single fin RMC.

The other cavities and structure within the BOAS may be provided utilizing RMC resulting in a BOAS RMC core assembly 154.

During casting, the various parts of the BOAS RMC core assembly 154 are placed into a die such as a ceramic mold. Molten metal is then poured into the mold. The BOAS RMC core assembly 154 can be held by rails of the die during the casting after the molten material hardens and the ceramic mold is removed, the BOAS segment 76 and RMC 154 remain. The RMC 154 is subsequently leached out in a chemical bath from the BOAS segment 76.

RMC provides flexibility in investment casting enabling the introduction of cooling passages 126 into relatively thin structures. The resulting seal body can then include circumferential grooving and fins, which is often desirable at the BOAS segment 76 interfaces with the blade tip 68T. The circumferentially grooving can create a more effective seal interface with the blade tip 68T.

RMC is one example method of providing the cooling passages 126. In another example, the BOAS segment 76 is created through an additive manufacturing process and RMC is not used. Manufacturing processes other than casting with RMC and additive manufacturing are used to create the BOAS segment in other examples.

Features of the disclosed examples include a BOAS having fins that are cooled. Since the fins are cooled, the fins (and associated grooves) can be utilized in BOAS exposed to relatively hotter areas of the engine, such as a first stage of the high pressure turbine section.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

Although embodiments of this invention have been disclosed, a worker of ordinary skill in the art would recognize that certain modifications would come within the scope of this invention. For that reason, the following claims should be studied to determine the true scope and content of this invention.

What is claimed is:

1. A sacrificial structure for forming internal cooling passages within a blade outer air seal, comprising:
   a refractory metal core to form an internal cooling passage within a fin of the blade outer air seal;
   wherein the fin extends between an opposed pair of grooves in a body of the blade outer air seal, the fin extends radially from the body and terminates at a radially inner fin face having one or more cooling outlets;
   wherein the internal cooling passage extends from a cooling cavity, through the fin, to at least one of the one or more cooling outlets; and
   wherein the refractory metal core includes a first radially extending portion dimensioned to extend from the cooling cavity, a second radially extending portion dimensioned to extend from a respective one of the one or more cooling outlets, and a circumferentially extending portion connecting the first and second radially extending portions such that the first radially extending portion is circumferentially offset from the second radially extending portion.

2. The sacrificial structure of claim 1, wherein the refractory metal core extends to a radially inner core face to align with the radially inner fin face.

3. The sacrificial structure of claim 2, wherein the fin is one of a plurality of fins extending radially from the body.

4. The sacrificial structure of claim 1, wherein an axial width of the fin is from 0.5 to 3.0 percent of an axial width of the body.

5. The sacrificial structure of claim 1, wherein the opposed pair of grooves includes a first circumferentially extending groove and a second circumferentially extending groove.

6. The sacrificial structure of claim 1, wherein the fin is one of a plurality of fins extending radially from the body.

7. The sacrificial structure of claim 6, wherein an axial width of the fin is less than 1 millimeter.

8. The sacrificial structure of claim 6, wherein the fin is one of from four to eight fins separate and distinct from each other.

9. The sacrificial structure of claim 1, wherein the body is distributed circumferentially about a blade array, the body extends axially between a leading edge face and a trailing edge face, and the body extends circumferentially between a first mate face and a second mate face.

10. The sacrificial structure of claim 9, wherein the radially inner fin face is configured to interface directly with the blade array.

11. The sacrificial structure of claim 9, wherein the fin is positioned axially between the pair of grooves.

12. A method of cooling an interface between a blade outer air seal and a rotating blade array, comprising:
    communicating a flow of fluid through at least one cooling passage within at least one fin of the blade outer air seal to an interface between the blade outer air seal and a rotating blade array;
    wherein the at least one fin extends between an opposed pair of grooves in a body of the blade outer air seal, the at least one fin extends radially from the body and terminates at a radially inner fin face having one or more cooling outlets, and the radially inner fin face extends along the interface;
    wherein the at least one cooling passage includes a first radially extending portion extending from a cooling cavity, a second radially extending portion extending from a respective one of the one or more cooling outlets, and a circumferentially extending portion connecting the first and second radially extending portions such that the first radially extending portion is circumferentially offset from the second radially extending portion; and
    communicating the fluid through the at least one cooling passage to the respective one of the one or more cooling outlets at the radially inner fin face, including communicating the flow in a radial direction through the first radially extending portion, then in a circumferential direction through the circumferentially extending portion, and then in a radial direction through the second radially extending portion.

13. The method of claim 12, wherein the pair of grooves extend circumferentially in the body of the blade outer air seal.

14. The method of claim 12, wherein the body extends axially between a leading edge face and a trailing edge face, and the body extends circumferentially between a first mate face and a second mate face.

15. The method of claim 14, wherein the at least one cooling passage includes a plurality of separate and distinct cooling passages distributed circumferentially through the at least one fin.

16. The method of claim 15, wherein the at least one fin is positioned axially between the pair of grooves.

17. The method of claim 16, wherein an axial width of the at least one fin is from 0.5 to 3.0 percent of an axial width of the body.

18. The method of claim 14, wherein the body is distributed circumferentially about the rotating blade array relative to an engine longitudinal axis.

19. The method of claim 18, wherein the at least one cooling passage includes a plurality of separate and distinct cooling passages distributed circumferentially through the at least one fin.

20. The method of claim 19, wherein the at least one fin is a plurality of fins interdigitated with a plurality of grooves in the body of the blade outer air seal, and the plurality of grooves comprise the opposed pair of grooves.

* * * * *